United States Patent
Jaeker et al.

(10) Patent No.: US 9,897,163 B2
(45) Date of Patent: Feb. 20, 2018

(54) ENERGY GUIDING CHAIN

(71) Applicant: igus GmbH, Cologne (DE)

(72) Inventors: Thilo-Alexander Jaeker, Sankt Augustin (DE); Dominik Barten, Mechenheim (DE); Joerg Dommnik, Much (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 15/127,664

(22) PCT Filed: Mar. 6, 2015

(86) PCT No.: PCT/EP2015/054765
§ 371 (c)(1),
(2) Date: Sep. 20, 2016

(87) PCT Pub. No.: WO2015/139973
PCT Pub. Date: Sep. 24, 2015

(65) Prior Publication Data
US 2017/0138440 A1    May 18, 2017

(30) Foreign Application Priority Data
Mar. 20, 2014  (DE) .................. 20 2014 101 274 U

(51) Int. Cl.
*F16G 13/16*  (2006.01)
*H02G 3/04*  (2006.01)

(52) U.S. Cl.
CPC .......... *F16G 13/16* (2013.01); *H02G 3/0456* (2013.01)

(58) Field of Classification Search
CPC ............................. F16G 13/16; H02G 11/006
(Continued)

(56) References Cited

U.S. PATENT DOCUMENTS 6,349,534 B1 *  2/2002  Zanolla ............... H02G 11/006
                                                          248/49
6,925,795 B2    8/2005  Komiya
(Continued)

FOREIGN PATENT DOCUMENTS

CH          704643       9/2012
DE        20002500       6/2000
(Continued)

OTHER PUBLICATIONS

Search Report from corresponding German Appln. No. 20 2014 101 274.5 dated Feb. 3, 2015.
(Continued)

*Primary Examiner* — David B Jones
(74) *Attorney, Agent, or Firm* — Grossman, Tucker, Perreault & Pfleger, PLLC

(57) ABSTRACT

The invention relates to an energy guiding chain for guiding cables, hoses and the like between two connecting points that move relative to each other, comprising a plurality of tubular chain links (1), which are connected to each other in articulated fashion and made of plastic, and each of which displays a bottom wall (2), adjoining, opposite side walls (3, 4), and a cover wall (5), where the cover wall (5) is or can be detachably connected to the side walls (3, 4), the side walls (3, 4) each display a pivot pin (6) and a joint opening (7) for the articulated connection of adjacent chain links (1), the pivoting angle is limited by stops (8) in both pivoting directions, and the cover walls (5), side walls (3, 4) and bottom walls (2) overlap over the entire pivoting angle. On an energy guiding chain of this kind, the protection of the interior is to be even further improved, and handling during opening and closing of the energy guiding chain facilitated. According to the invention, this is made possible by the fact that the cover wall (5) displays at least one fastening tab (11) on each side, in that the fastening tabs (11) reach over the
(Continued)

outer surfaces of the side walls (3, 4), in that snap-in elements (12) are provided on the inner surfaces of the fastening tabs (11) facing towards the outer surfaces of the side walls (3, 4), in that mating snap-in elements (13) are provided on the outer surfaces of the side walls (3, 4), interacting with the snap-in elements (12) of the fastening tabs (11), and in that the snap-in elements (12) and mating snap-in elements (13) form a hinge on at least one side of the energy guiding chain.

12 Claims, 4 Drawing Sheets

(58) Field of Classification Search
USPC .......................................................... 59/78.1
See application file for complete search history.

(56) References Cited

U.S. PATENT DOCUMENTS

| | | | |
|---|---|---|---|
| 7,249,452 B2 * | 7/2007 | Komiya | F16G 13/16 248/49 |
| 7,426,823 B2 | 9/2008 | Blase et al. | |
| 7,520,122 B2 * | 4/2009 | Kitagawa | F16G 13/16 248/49 |
| 8,220,243 B2 * | 7/2012 | Komiya | F16G 13/16 248/49 |
| 8,397,480 B2 | 3/2013 | Jaeker et al. | |
| 8,505,272 B1 * | 8/2013 | Komiya | F16G 13/16 248/49 |

FOREIGN PATENT DOCUMENTS

| | | |
|---|---|---|
| DE | 10355545 | 6/2004 |
| DE | 202004005800 | 9/2005 |
| DE | 102008015954 | * 10/2008 |
| DE | 202009005650 | 8/2009 |
| JP | 2013034327 | 2/2013 |
| WO | 2006/039750 | 4/2006 |

OTHER PUBLICATIONS

PCT International Search Report dated Jun. 23, 2015, received in corresponding PCT Application No. PCT/EP2015/054765. English translation attached.
PCT English language International Preliminary Report on Patentability dated Sep. 29, 2016, received in corresponding PCT Application No. PCT/EP2015/054765.

* cited by examiner

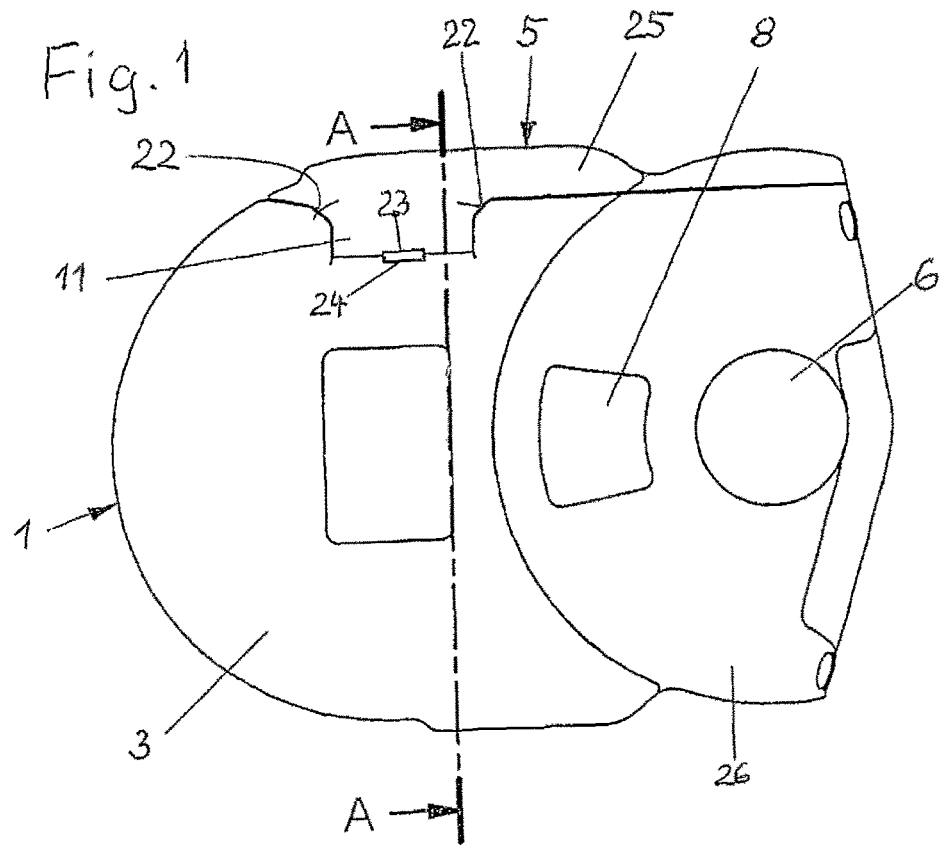
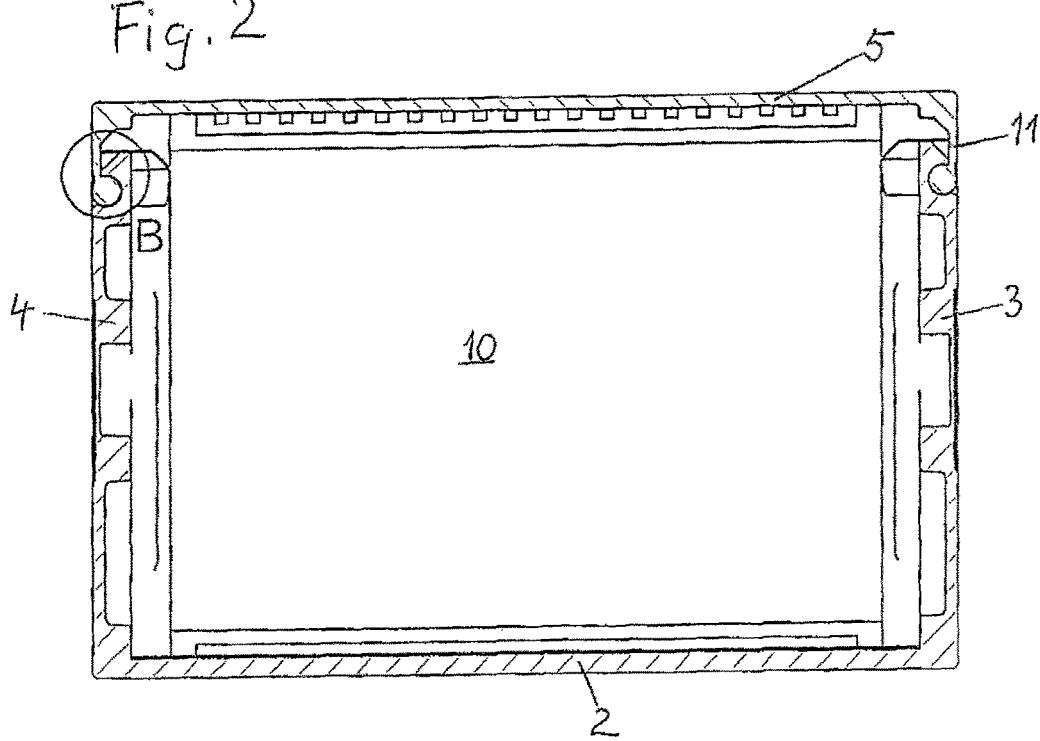

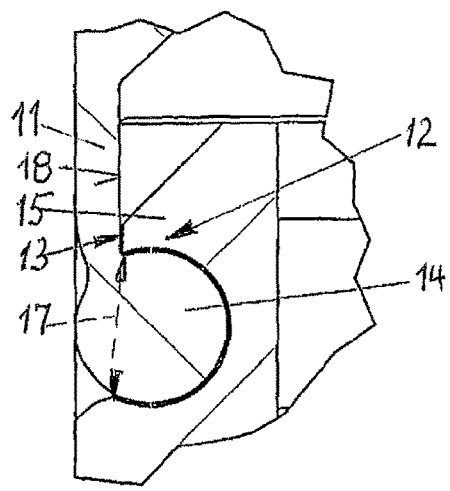
Fig. 3
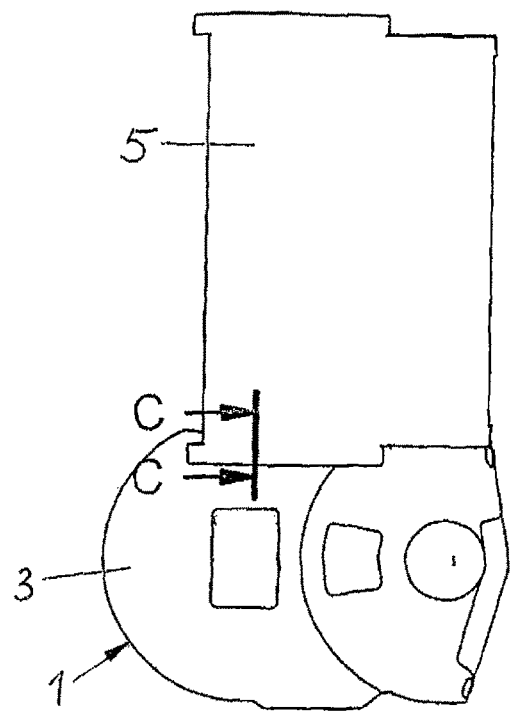
Fig. 4
Fig. 5
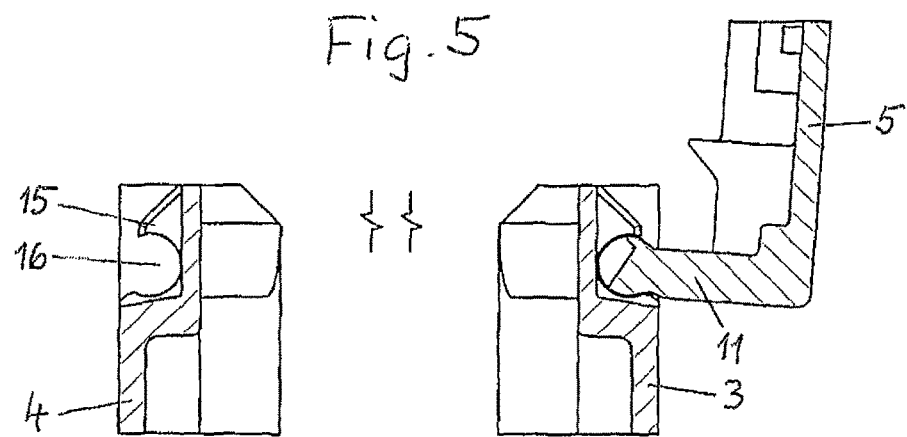

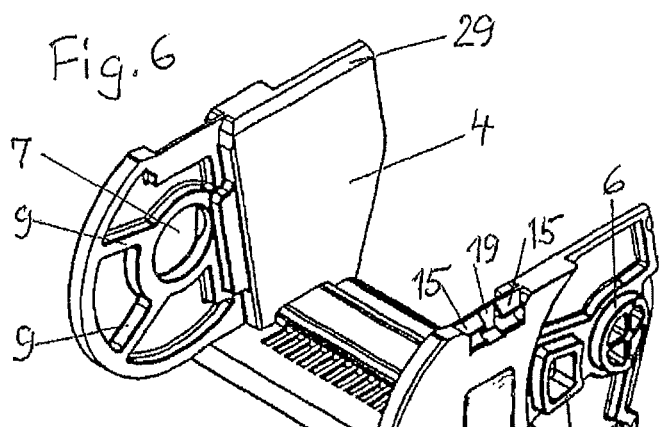
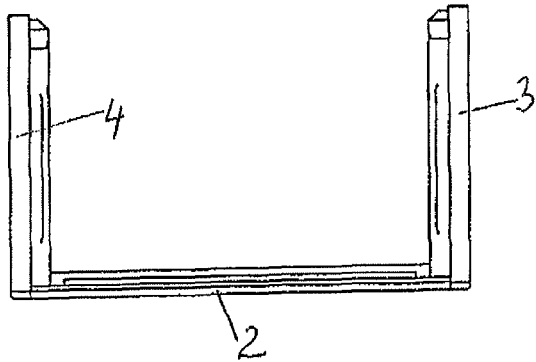
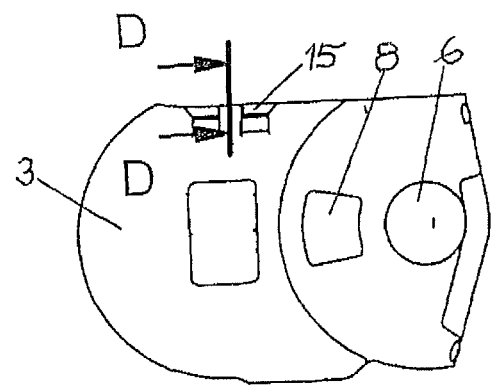
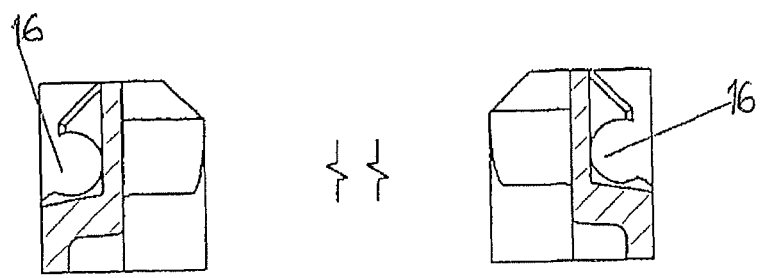

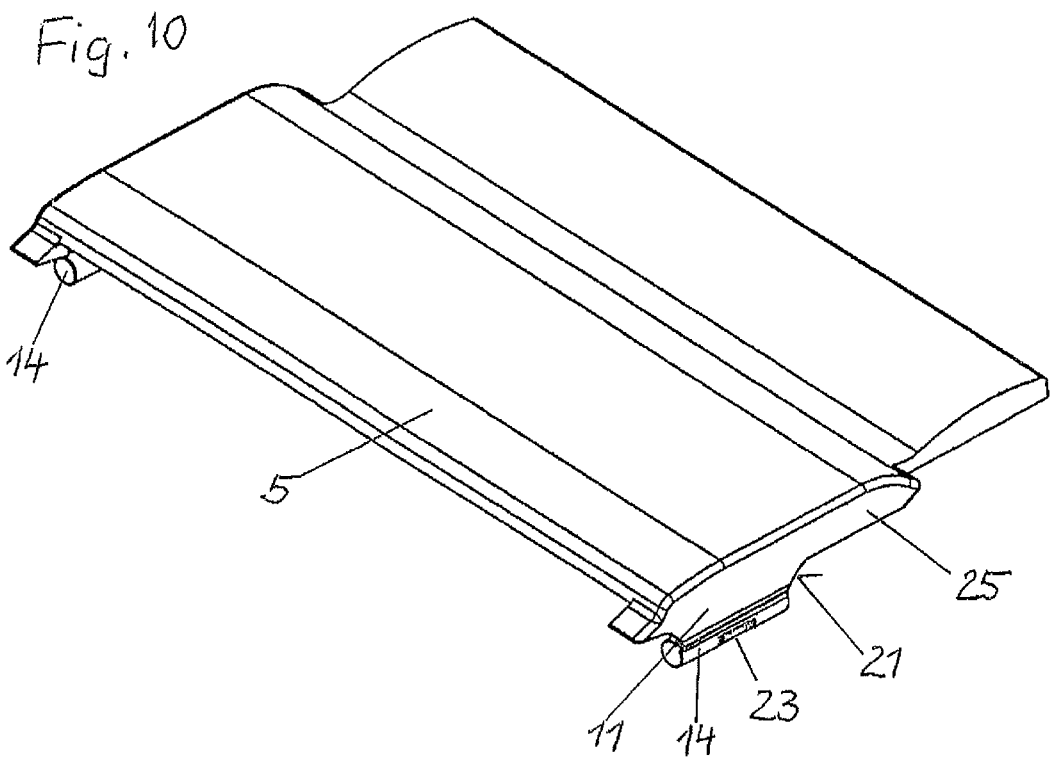
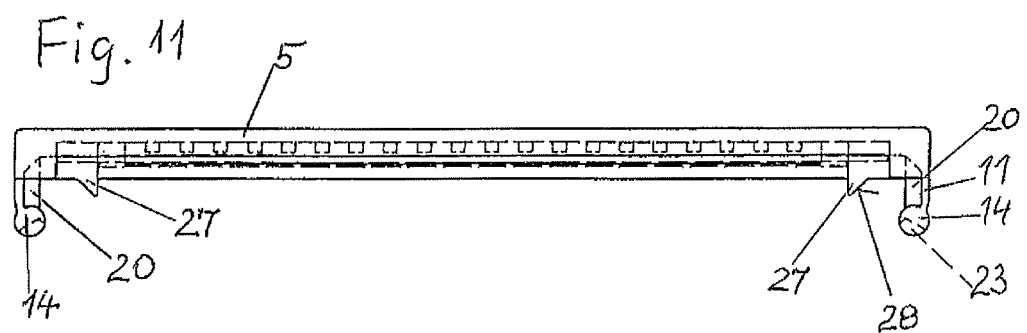
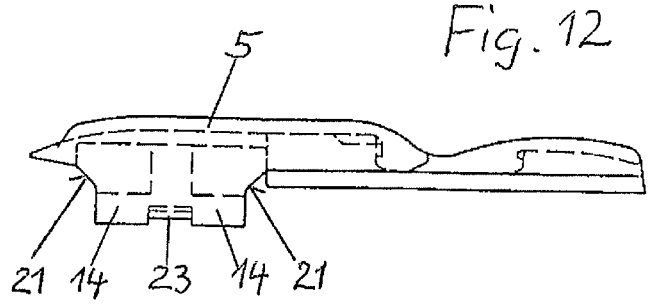

ENERGY GUIDING CHAIN

The invention relates to an energy guiding chain for guiding cables, hoses and the like between two connecting points that move relative to each other, comprising a plurality of tubular chain links, which are connected to each other in articulated fashion and made of plastic, and each of which displays a bottom wall, adjoining, opposite side walls, and a cover wall, where the cover wall is or can be detachably connected to the side walls, the side walls each display a pivot pin and a joint opening for the articulated connection of adjacent chain links, the pivoting angle is limited by stops in both pivoting directions, and the cover walls, side walls and bottom walls of adjacent chain links overlap over the entire pivoting angle.

Energy chains of this kind, which are very largely closed over their entire circumference, are particularly used in environments where there is a risk of foreign bodies getting into the chain, e.g. on metal-cutting machine tools, where chips can fall onto the surface of the energy chain and get into the interior between the chain links during pivoting in the area of a bend.

In a known energy chain of the aforementioned type (DE 20 2009 005 605 U1), protection of the interior is already largely ensured by the fact that the surface of the cover walls, the bottom walls, and at least of the transitional zones of these walls and the side walls, has a convex curvature in the circumferential direction. Owing to this curvature of the individual wall areas, it is already very effectively ensured that unwanted foreign bodies cannot stick to the energy chain so easily, and thus not get into the interior. In this respect, the known energy guiding chain already ensures extensive protection of the interior.

The object of the invention is, while retaining the advantages of the prior art, to even further secure the protection of the interior of the energy guiding chain, and to facilitate handling when opening and closing the energy guiding chain.

According to the invention, this object is solved in that the cover wall displays at least one fastening tab on each side, in that the fastening tabs reach over the outer surfaces of the side walls, in that snap-in elements are provided on the inner surfaces of the fastening tabs facing towards the outer surfaces of the side walls, in that mating snap-in elements are provided on the outer surfaces of the side walls, interacting with the snap-in elements of the fastening tabs, and in that the snap-in elements and mating snap-in elements form a hinge on at least one side of the energy guiding chain.

As a result of this design, where the fastening tabs reach over the outside of the side walls, optimum protection of the interior against the penetration of foreign bodies is ensured, this requiring extremely little design effort.

The snap-in elements provided on the inner surfaces of the fastening tabs are preferably designed as projections pointing inwards towards the side walls, while the mating snap-in elements located on the outer surfaces of the side walls have the form of projecting snap-in lugs, the snap-in connection being created in that the projections of the fastening tabs snap over the snap-in lugs, the interacting components undergoing slight elastic deformation in the process.

The features according to the invention make it possible to very easily create a structural design where the snap-in connections on both sides function in the manner of a hinge. This is advantageously achieved in that the projections provided on the fastening tabs are located on the lower ends of the fastening tabs and of circular cylindrical design, in that hollow cylindrical receptacles, which are open towards the outside and whose inside diameter corresponds to the outside diameter of the circular cylindrical projections, are provided below the snap-in lugs provided on the outer surfaces of the side walls, and in that, in snapped-in state of the corresponding cover wall, the projections are mounted in the hollow cylindrical receptacles of the side walls in the manner of a hinge.

A connection of this kind can be designed as a simple snap-in connection, where the cover wall is simply placed on the upper ends of the side walls, where it snaps into position.

For the hinge structure, the outer opening area of the receptacles is expediently slightly smaller than the diameter of the circular cylindrical projections, such that a reliable hinge is created on both sides of the cover wall, and the cover wall can optionally be swung open to either wide, without the cover wall having to be detached from the energy guiding chain.

The snap-in connection between the side walls and the cover wall can be provided in a recessed area of the outer surface of the respective side wall.

The recessed area of the respective side wall is preferably dimensioned in such a way that, in snapped-in state of the snap-in connection, the outer side of the fastening tab lies flush with the outer surface of the respective side wall. This creates a relatively smooth outer surface of the energy chain, without interfering, lateral protrusions.

In a preferred embodiment of the invention, the middle area of the snap-in lugs provided on the side walls displays an interruption, while a rib is provided above the circular cylindrical projections located on the cover wall, where, in snapped-in state of the cover wall, the rib positively engages the respective interruption in the snap-in lug. This measure additionally secures the snap-in connection against unintentional transverse shifting.

To achieve reliable engagement of the fastening tabs, said tabs can be provided with lateral bevels, which interact with insertion bevels provided on the side walls when closing the cover wall.

For convenient release of the snap-in connections, a recess having at least the width of the working end of a screwdriver can be provided, roughly in the middle area of the circular cylindrical projections located on the fastening tabs. It is then easily possible to lever open the corresponding snap-in connection by inserting a screwdriver, or some other suitable tool, such that the cover wall can be swung open to the desired side, or completely detached.

Alternatively or additionally, a recess having at least the width of the working end of a screwdriver can likewise be provided at the lower edge of the area of the hollow cylindrical receptacle that is open towards the outside.

The outside of the lateral edges of the cover wall adjoining the fastening tabs preferably lies flush with the outer surface of the side wall, such that a smooth lateral surface is obtained.

In a preferred embodiment of the invention, the lateral edges of the cover wall adjoining the fastening tabs can display a downward-pointing flange, where the flange is provided with a bevel over its length, and where a corresponding mating bevel is formed on the upper edges of the side walls, against which the corresponding bevel of the cover wall lies flush in snapped-in state. These bevels and mating bevels serve to center the cover wall on the side walls, and also to reliably seal off the interior.

An example of the invention is illustrated in the drawing and described in detail below on the basis of the drawing.

The Figures show the following:

FIG. 1 A single chain link of the energy guiding chain according to the invention, FIG. 2 A section along Line A-A in FIG. 1, FIG. 3 A larger view of Section B in FIG. 2, FIG. 4 A smaller view of the chain link according to FIG. 1, with the cover wall swung open, FIG. 5 A section along Line C-C in FIG. 4, FIG. 6 A perspective view of the chain link according to FIG. 1 and FIG. 4, without the cover wall, FIG. 7 A front view of the chain link according to FIG. 6, FIG. 8 A side view of the chain link according to FIG. 6, without the cover wall, FIG. 9 A section along Line D-D in FIG. 8, FIG. 10 The cover wall belonging to the chain link according to FIG. 1, on the same scale as FIG. 1, FIG. 11 A front view of the cover wall according to FIG. 10, and FIG. 12 A side view of the cover wall according to FIG. 10.

FIGS. 1 to 12 show an embodiment of the energy guiding chain according to the invention, which serves to guide cables, hoses and the like between two connecting points that move relative to each other. An energy guiding chain of this kind comprises a plurality of tubular chain links 1, which are connected to each other in articulated fashion and made of plastic, and each of which displays a bottom wall 2, adjoining, opposite side walls 3 and 4, and a cover wall 5.

In the embodiment illustrated in the drawing, bottom wall 2 and side walls 3 and 4 are of one-piece design, whereas cover wall 5 can be detachably connected to the side walls.

According to a further embodiment, not shown in the drawing, bottom wall 2 could, of course, optionally also be detachable.

As can particularly be seen from FIG. 6, side walls 3 and 4 each display a pivot pin 6 on their outer sides and, at a distance from it, a joint opening 7 on the inner side. Pivot pins 6 snap into the respective joint opening 7 during assembly of the link chain or when elastically sliding chain links 1 into each other. This creates an articulated connection between adjacent chain links 1. The pivoting angle of chain links 1 relative to each other is limited in both directions by stops 8, which are located on the respective outer sides of side walls 3 and 4, and interact with corresponding mating stops 9, which are located on the inner surfaces of side walls 3 and 4.

Cover walls 5, side walls 3 and 4, and bottom walls 2 of adjacent chain links 1 overlap each other over the entire envisaged pivoting angle, such that, even when the direction of movement of the energy guiding chain changes, a closed interior 10 is ensured for the hoses, cables and the like guided in the energy guiding chain.

In the embodiment illustrated in the drawing, only cover wall 5 is detachable from the duct comprising side walls 3, 4 and bottom wall 5. In this context, cover wall 5 displays a fastening tab 11 on either side. In assembled state, the two fastening tabs 11 reach over the outer surfaces of side walls 3 and 4. To fix cover wall 5 on side walls 3 and 4, the inner sides of fastening tabs 11 facing towards the outer surfaces of side walls 3 and 4 are provided with snap-in elements 12, which interact with mating snap-in elements 13, provided on the outer surfaces of side walls 3 and 4.

Snap-in elements 12, provided on the inner surfaces of fastening tabs 11, are designed as projections 14, pointing inwards towards side walls 3 and 4. The mating snap-in elements located on the outer surfaces of side walls 3 and 4 have the form of projecting snap-in lugs 15. The snap-in connection is then created in that projections 14 on fastening tabs 11 snap over snap-in lugs 15, fastening tabs 11 undergoing slight elastic deformation in the process.

Projections 14, provided on fastening tabs 11, are located on the lower ends of fastening tabs 11 and are of circular cylindrical design. Provided below snap-in lugs 15, located on the outer surfaces of side walls 3 and 4, are hollow cylindrical receptacles 16, which are open towards the outside and whose inside diameter corresponds to the outside diameter of circular cylindrical projections 14.

In snapped-in state of the corresponding cover wall 5, circular cylindrical projections 14 are mounted in hollow cylindrical receptacles 16 in the manner of a hinge. The respective cover wall 5 can then be swung open and closed again like a hinged lid, both to the one side and to the other.

To ensure that the cover wall remains firmly anchored in the respective side wall when swung open, outer opening area 17 of hollow cylindrical receptacles 16 is designed to be slightly smaller than the outside diameter of circular cylindrical projections 14.

As can particularly be seen from FIGS. 2 and 3, the snap-in connection between side walls 3, 4 and cover wall 5 is formed in a recessed area 18 of the outer surface of the respective side wall 3 or 4. In this context, recessed area 18 of the respective side wall 3 or 4 is dimensioned in such a way that, in snapped-in state of the snap-in connection, the outer side of the respective fastening tab 11 lies flush with the outer surface of the respective side wall 3 or 4. This measure creates a smooth outer surface of the energy guiding chain when the individual chain links 1 are assembled.

The hinge-like engagement of circular cylindrical projections 14, provided on fastening tabs 11, in hollow cylindrical receptacles 16, provided on side walls 3 and 4, is extremely stable and reliable. To ensure additional protection against transverse shifting, the middle area of snap-in lugs 15, provided on side walls 3 and 4, is provided with a recess or interruption 19, as can particularly be seen from FIGS. 6 and 8. Provided above each circular cylindrical projection 14, located on cover wall 5, is a rib 20, which positively engages the respective interruption 19 in snap-in lug 15 in snapped-in state of cover wall 5.

The closing of cover walls 5, following the insertion of hoses, cables and the like into the energy guiding chain, is facilitated by the fact that fastening tabs 11 are provided with lateral bevels 21, which interact with corresponding insertion bevels 22, provided on side walls 3 and 4.

In snapped-in state of the snap-in connection, cover walls 5 sit relatively tightly on chain links 1. To facilitate opening of cover walls 5, a recess 23 is provided, roughly in the middle area of circular cylindrical projections 14, located on fastening tabs 11. Said recess 23 is at least wide enough to permit application of the working end of a screwdriver in order to lever open cover wall 5.

For the same purpose, a corresponding recess 24, having at least the width of the working end of a screwdriver, is provided at the lower edge of the area of the respective hollow cylindrical receptacle 16 that is open towards the outside. As can particularly be seen in FIG. 1, the two recesses 23 and 24 are located directly one above the other in snapped-in state of cover wall 5, such that the respective cover wall 5 can conveniently be levered open on one side with the help of a screwdriver, in order to swing open cover wall 5 on one side.

Lateral edges 25 of cover wall 5, adjoining fastening tabs 11, lie flush with the outer surface of the respective side wall 3 or 4 on the outside. In this context, the respective lateral edge 25, illustrated in FIGS. 1 and 10, lies exactly in the plane of the area of the side wall 3 illustrated in FIG. 1 that lies on the outside in assembled state of the energy guiding chain. In finally assembled state of the energy guiding chain, the right-hand, slightly recessed area 26, illustrated in FIG. 1, is overlapped by the respective side wall of the subsequent chain link, such that a smooth surface is created on the outside of the energy guiding chain.

As can particularly be seen from FIGS. 2 and 11, the lateral edges of cover wall 5, adjoining fastening tab 11, display a downward-pointing flange 27, which is provided with a bevel 28 over its entire length. The upper edges of side walls 3 and 4 are provided with a corresponding mating bevel 29, as can particularly be seen from FIG. 6. In fitted and snapped-in state of cover wall 5, bevel 28 of cover wall 5 lies firmly and flush against mating bevel 29, such that good guidance of cover wall 5 on the upper edges of side walls 3 and 4 is thus obtained, and additional sealing of interior 10 of the energy guiding chain is created.

LIST OF REFERENCE NUMBERS

1 Chain link
2 Bottom wall
3 Side wall
4 Side wall
5 Cover wall
6 Pivot pin
7 Joint opening
8 Stop
9 Mating stop
10 Closed interior
11 Fastening tab
12 Snap-in element
13 Mating snap-in element
14 Circular cylindrical projection
15 Snap-in lug
16 Hollow cylindrical receptacle
17 Outer opening area of receptacle 16
18 Recessed area
19 Interruption
20 Rib
21 Lateral bevel
22 Insertion bevel
23 Recess on projection 14
24 Recess on receptacle 16
25 Lateral edge
26 Recessed area
27 Downward-pointing flange
28 Bevel of flange 27
29 Mating bevel on the side walls

What is claimed is:

1. An energy guiding chain for guiding cables, hoses or other lines between two connecting points that move relative to each other, comprising:
   a plurality of tubular chain links connected to each other in an articulable arrangement and made of plastic,
   each tubular chain link of the plurality of tubular chain links have a bottom wall, adjoining, opposite side walls, and a cover wall, where the cover wall is detachably connectable to the side walls,
   the side walls of each tubular chain link each have a pivot pin and a joint opening for an articulable connection of adjacent chain links, the articulable connection being articulable in two pivoting directions about a pivoting angle which is limited by a stop in each pivoting direction, and the cover walls, side walls and bottom walls overlap over an entirety of the pivoting angle,
   wherein, for each tubular chain link of the plurality of tubular chain links,
      the cover wall has two sides with at least one fastening tab on each side of the two sides, each of the fastening tabs having an inner surface which overlies and faces towards an outer surface of one of the side walls,
      the inner surface of each fastening tab comprises a snap-in element,
      the outer surface of each side wall comprises a mating snap-in element which interacts with the snap-in element of one of the fastening tabs, and
      the snap-in element and the mating snap-in element interacting therewith form a hinge on at least one side of the energy guiding chain.

2. The energy guiding chain according to claim 1, wherein, for each tubular chain link of the plurality of tubular chain links:
   the snap-in element of the inner surface of the each fastening tab comprises a projection,
   the mating snap-in element of the outer surface of the each side wall comprises a snap-in lug, and
   each one of the projections is snappable over a corresponding one of the snap-in lugs and forms a corresponding snap-in connection.

3. The energy guiding chain according to claim 2, wherein, for each tubular chain link of the plurality of tubular chain links:
   the projection of the inner surface of each fastening tab comprises a circular cylindrical projection having an outside diameter, and which is located on a lower end of each fastening tab,
   the outer surface of each side wall comprises a hollow, cylindrical receptacle located below the snap-in lug, the cylindrical receptacle having a receptacle opening, and an inside diameter which corresponds to the outside diameter of at least one of the circular cylindrical projections, and
   each one of the circular cylindrical projections is mountable in a corresponding one of the cylindrical receptacles and forms a corresponding hinge.

4. The energy guiding chain according to claim 3, wherein, for each tubular chain link of the plurality of tubular chain links:
   the receptacle opening of each receptacle has an area which is smaller than the outside diameter of the corresponding circular cylindrical projection.

5. The energy guiding chain according to claim 2, wherein, for each tubular chain link of the plurality of tubular chain links:
   the outer surface of each side wall has a recessed area, and
   each one of the snap-in connections is located in a corresponding one of the recessed areas.

6. The energy guiding chain according to claim 5, wherein, for each tubular chain link of the plurality of tubular chain links:
   the fastening tab on each side of the cover has an outer surface, and
   the recessed area of the outer surface of each side wall is dimensioned such that, for each snap-in connection, the outer surface of one of the fastening tabs lies flush with the outer surface of a corresponding one of the side walls.

7. The energy guiding chain according to claim 3, wherein, for each tubular chain link of the plurality of tubular chain links:
the snap-in lug of each side wall comprises a middle area having an interruption
the cover wall has a rib above each circular cylindrical projection, and
for each snap-in connection, one of the ribs positively engages the interruption of a corresponding one of the snap-in lugs.

8. The energy guiding chain according to claim 1, wherein, for each tubular chain link of the plurality of tubular chain links:
the fastening tabs are each provided with lateral bevels, the side walls are each provided with insertion bevels, and
the lateral bevels of one of the fastening tabs interact with the insertion bevels of a corresponding one of the side walls when connecting the cover wall to the corresponding side wall.

9. The energy guiding chain according to claim 2, wherein wherein, for each tubular chain link of the plurality of tubular chain links:
the circular cylindrical projection of each fastening tab has a middle area, and
a recess is located in the middle area of each circular cylindrical projection.

10. The energy guiding chain according to claim 2, wherein, for each tubular chain link of the plurality of tubular chain links:
the hollow, cylindrical receptacle of each side wall has a lower edge, and
a recess is located at the lower edge of each hollow, cylindrical receptacle the.

11. The energy guiding chain according to claim 1, wherein, for each tubular chain link of the plurality of tubular chain links:
the cover wall has lateral edges adjoining each fastening tab, the lateral edges having an outside, and
the outside of each lateral edge adjoining one of the fastening tabs lies flush with the outer surface of a corresponding one of the side walls.

12. The energy guiding chain according to claim 1, wherein, for each tubular chain link of the plurality of tubular chain links:
the cover wall has lateral edges adjoining each fastening tab which each having a downward-pointing flange,
each one of the downward-pointing flanges is provided with a bevel over a length thereof,
the side walls each having an upper edge having a mating bevel, and
the mating bevel of one of the side walls lies flush against a corresponding one of the bevels of the cover wall when the cover is in snapped-in state with the side walls.

\* \* \* \* \*

UNITED STATES PATENT AND TRADEMARK OFFICE
CERTIFICATE OF CORRECTION

PATENT NO. : 9,897,163 B2  
APPLICATION NO. : 15/127664  
DATED : February 20, 2018  
INVENTOR(S) : Jaeker et al.

Page 1 of 1

It is certified that error appears in the above-identified patent and that said Letters Patent is hereby corrected as shown below:

In the Claims

In Column 6, Line 22, in Claim 2, before "each" delete "the".

In Column 6, Line 24, in Claim 2, before "each" delete "the".

In Column 7, Line 19, in Claim 9, after "claim 2," delete "wherein".

In Column 8, Line 4, in Claim 10, after "receptacle" delete "the".

Signed and Sealed this  
Twelfth Day of May, 2020

Andrei Iancu  
*Director of the United States Patent and Trademark Office*